United States Patent
Keith, Jr.

(10) Patent No.: US 8,423,821 B1
(45) Date of Patent: Apr. 16, 2013

(54) VIRTUAL RECOVERY SERVER

(75) Inventor: Robert O. Keith, Jr., Modesto, CA (US)

(73) Assignee: MAXSP Corporation, Sunnyvale, CA (US)

( * ) Notice: Subject to any disclaimer, the term of this patent is extended or adjusted under 35 U.S.C. 154(b) by 301 days.

(21) Appl. No.: 11/644,451

(22) Filed: Dec. 21, 2006

(51) Int. Cl.
*G06F 11/00* (2006.01)

(52) U.S. Cl.
USPC ............................................. 714/6.3; 714/13

(58) Field of Classification Search .................. 714/6, 7, 714/13
See application file for complete search history.

(56) References Cited

U.S. PATENT DOCUMENTS

| | | | |
|---|---|---|---|
| 4,866,635 A | 9/1989 | Kahn et al. ..................... 364/513 |
| 5,602,990 A | 2/1997 | Leete ....................... 395/183.22 |
| 5,649,196 A | 7/1997 | Woodhill et al. ............. 395/620 |
| 5,659,743 A | 8/1997 | Adams et al. ................ 395/621 |
| 5,787,409 A | 7/1998 | Seiffert et al. |
| 5,802,364 A | 9/1998 | Senator et al. |
| 5,812,751 A | 9/1998 | Ekrot et al. |
| 5,835,911 A | 11/1998 | Nakagawa et al. |
| 5,897,635 A | 4/1999 | Torres et al. |
| 5,933,647 A | 8/1999 | Aronberg et al. |
| 5,950,010 A | 9/1999 | Hesse et al. |
| 5,974,547 A | 10/1999 | Klimenko ........................... 713/2 |
| 6,012,152 A | 1/2000 | Douik et al. ..................... 714/26 |
| 6,029,196 A | 2/2000 | Lenz ............................. 709/221 |
| 6,067,582 A | 5/2000 | Smith et al. |
| 6,144,959 A | 11/2000 | Anderson et al. |
| 6,170,065 B1 | 1/2001 | Kobata et al. ..................... 714/7 |
| 6,189,101 B1 | 2/2001 | Dusenbury, Jr. |
| 6,209,089 B1 | 3/2001 | Selitrennikoff et al. .......... 713/2 |
| 6,212,660 B1 | 4/2001 | Joeressen et al. ............. 714/758 |
| 6,282,711 B1 | 8/2001 | Halpern et al. |
| 6,301,612 B1 | 10/2001 | Selitrennikoff et al. ....... 709/220 |
| 6,314,428 B1 | 11/2001 | Brew et al. |
| 6,317,761 B1 | 11/2001 | Landsman et al. ............. 707/513 |
| 6,349,137 B1 | 2/2002 | Hunt et al. |
| 6,356,915 B1 | 3/2002 | Chtchetkine et al. ......... 707/200 |
| 6,363,400 B1 | 3/2002 | Chtchetkine et al. ......... 707/200 |
| 6,366,296 B1 | 4/2002 | Boreczky et al. ............. 345/719 |
| 6,378,035 B1 | 4/2002 | Parry et al. ..................... 711/110 |
| 6,421,777 B1 | 7/2002 | Pierre-Louis et al. ............ 713/2 |
| 6,449,658 B1 | 9/2002 | Lafe et al. ...................... 709/247 |
| 6,459,499 B1 | 10/2002 | Tomat |

(Continued)

OTHER PUBLICATIONS http://www.backup.com.

(Continued)

*Primary Examiner* — Philip Guyton
(74) *Attorney, Agent, or Firm* — Haverstock & Owens LLP

(57) ABSTRACT

A virtual recovery server is described herein. The virtual recovery server is a software implementation on a storage server which generates a virtual server to replace a physical server when the physical server becomes inaccessible. While the physical server is inaccessible, the virtual recovery server is able to mimic the actions and data contained on the physical server. Thus, when users attempt to access an application or data that is on the physical server, they will not experience an interruption and will continue to access the information as if the physical server were up and running. The virtual recovery server is able to run for up to a number of days. When a new or repaired physical server is available the virtual recovery server is deleted after the data acquired by the virtual server is transmitted to the new physical server.

47 Claims, 4 Drawing Sheets

U.S. PATENT DOCUMENTS

| | | | |
|---|---|---|---|
| 6,463,530 B1 | 10/2002 | Sposato | 713/2 |
| 6,473,794 B1 | 10/2002 | Guheen et al. | 709/223 |
| 6,477,531 B1 | 11/2002 | Sullivan et al. | |
| 6,490,677 B1 | 12/2002 | Aguilar et al. | 713/1 |
| 6,536,037 B1 | 3/2003 | Barrese et al. | 717/151 |
| 6,553,375 B1 | 4/2003 | Huang et al. | |
| 6,556,950 B1 | 4/2003 | Schwenke et al. | 702/183 |
| 6,606,744 B1 | 8/2003 | Mikurak | 717/174 |
| 6,625,651 B1 | 9/2003 | Swartz et al. | |
| 6,625,754 B1 | 9/2003 | Aguilar et al. | |
| 6,633,782 B1 | 10/2003 | Schleiss et al. | |
| 6,636,857 B2 | 10/2003 | Thomas et al. | 707/10 |
| 6,654,797 B1 | 11/2003 | Kamper | 709/220 |
| 6,654,801 B2 | 11/2003 | Mann et al. | |
| 6,694,375 B1 | 2/2004 | Beddus et al. | 709/249 |
| 6,697,852 B1 | 2/2004 | Ryu | |
| 6,704,886 B1 | 3/2004 | Gill et al. | |
| 6,718,464 B2 | 4/2004 | Cromer et al. | 713/2 |
| 6,728,530 B1 | 4/2004 | Heinonen et al. | |
| 6,735,625 B1 | 5/2004 | Ponna | 709/223 |
| 6,751,658 B1 | 6/2004 | Haun et al. | 709/222 |
| 6,757,729 B1 | 6/2004 | Devarakonda et al. | |
| 6,816,462 B1 | 11/2004 | Booth, III et al. | 370/248 |
| 6,816,882 B1 | 11/2004 | Conner et al. | |
| 6,820,180 B2 * | 11/2004 | McBrearty et al. | 711/162 |
| 6,871,210 B1 | 3/2005 | Subramanian | 709/203 |
| 6,880,108 B1 | 4/2005 | Gusler et al. | |
| 6,885,481 B1 | 4/2005 | Dawe | |
| 6,886,020 B1 | 4/2005 | Zahavi et al. | 707/204 |
| 6,915,343 B1 | 7/2005 | Brewer et al. | 709/224 |
| 6,954,853 B2 | 10/2005 | Wang et al. | |
| 6,954,930 B2 | 10/2005 | Drake et al. | |
| 6,959,235 B1 | 10/2005 | Abdel-Malek et al. | |
| 6,985,967 B1 | 1/2006 | Hipp | |
| 7,003,560 B1 | 2/2006 | Mullen et al. | |
| 7,003,663 B2 | 2/2006 | Lagosanto et al. | |
| 7,024,471 B2 | 4/2006 | George et al. | |
| 7,058,698 B2 | 6/2006 | Chatterjee et al. | |
| 7,080,118 B2 | 7/2006 | Hildebrand | |
| 7,143,307 B1 * | 11/2006 | Witte et al. | 714/6 |
| 7,149,698 B2 | 12/2006 | Guheen et al. | |
| 7,175,078 B2 | 2/2007 | Ban et al. | |
| 7,178,166 B1 | 2/2007 | Taylor et al. | |
| 7,194,445 B2 | 3/2007 | Chan et al. | |
| 7,200,779 B1 | 4/2007 | Coss, Jr. et al. | |
| 7,210,143 B2 | 4/2007 | Or et al. | |
| 7,237,122 B2 | 6/2007 | Kadam et al. | |
| 7,260,597 B1 | 8/2007 | Hofrichter et al. | |
| 7,287,053 B2 | 10/2007 | Bodin | |
| 7,328,367 B2 | 2/2008 | Ukai et al. | |
| 7,337,311 B2 | 2/2008 | Chen et al. | |
| 7,392,046 B2 | 6/2008 | Leib et al. | |
| 7,401,125 B1 | 7/2008 | Uchida et al. | |
| 7,480,822 B1 | 1/2009 | Arbon et al. | |
| 7,487,383 B2 * | 2/2009 | Bensinger | 714/4.11 |
| 7,512,584 B2 | 3/2009 | Keith, Jr. | |
| 7,571,467 B1 | 8/2009 | Priestley et al. | |
| 7,627,694 B2 | 12/2009 | Sreenivasan et al. | |
| 7,698,487 B2 | 4/2010 | Rothman et al. | |
| 7,788,524 B2 * | 8/2010 | Wing et al. | 714/4 |
| 2001/0037323 A1 | 11/2001 | Moulton et al. | 707/1 |
| 2001/0049793 A1 | 12/2001 | Sugimoto | 713/200 |
| 2002/0013827 A1 | 1/2002 | Edstrom et al. | |
| 2002/0035674 A1 | 3/2002 | Vetrivelkumaran et al. | |
| 2002/0049764 A1 | 4/2002 | Boothby et al. | 707/100 |
| 2002/0083183 A1 | 6/2002 | Pujare et al. | |
| 2002/0087625 A1 | 7/2002 | Toll et al. | |
| 2002/0087963 A1 | 7/2002 | Eylon et al. | |
| 2002/0091763 A1 | 7/2002 | Shah et al. | |
| 2002/0094868 A1 | 7/2002 | Tuck et al. | |
| 2002/0104080 A1 | 8/2002 | Woodard et al. | |
| 2002/0107920 A1 | 8/2002 | Hotti | |
| 2002/0107945 A1 | 8/2002 | George et al. | |
| 2002/0116585 A1 | 8/2002 | Scherr | 711/133 |
| 2002/0124092 A1 | 9/2002 | Urien | 709/229 |
| 2002/0138640 A1 | 9/2002 | Raz et al. | |
| 2002/0157089 A1 | 10/2002 | Patel et al. | |
| 2002/0161868 A1 | 10/2002 | Paul et al. | 709/221 |
| 2002/0188941 A1 | 12/2002 | Cicciarelli et al. | |
| 2003/0005096 A1 | 1/2003 | Paul et al. | 709/222 |
| 2003/0033379 A1 | 2/2003 | Civanlar et al. | 709/218 |
| 2003/0036882 A1 | 2/2003 | Harper et al. | |
| 2003/0037328 A1 | 2/2003 | Cicciarelli et al. | |
| 2003/0041136 A1 | 2/2003 | Cheline et al. | 709/223 |
| 2003/0046371 A1 | 3/2003 | Falkner | |
| 2003/0051128 A1 | 3/2003 | Rodriguez et al. | 713/100 |
| 2003/0055878 A1 | 3/2003 | Fletcher et al. | |
| 2003/0078960 A1 | 4/2003 | Murren et al. | |
| 2003/0110188 A1 | 6/2003 | Howard et al. | |
| 2003/0126242 A1 | 7/2003 | Chang | 709/222 |
| 2003/0191730 A1 | 10/2003 | Adkins et al. | |
| 2003/0204562 A1 | 10/2003 | Hwang | |
| 2003/0233383 A1 | 12/2003 | Koskimies | |
| 2003/0233493 A1 | 12/2003 | Boldon et al. | |
| 2004/0010716 A1 | 1/2004 | Childress et al. | |
| 2004/0068554 A1 | 4/2004 | Bales et al. | |
| 2004/0073787 A1 | 4/2004 | Ban et al. | |
| 2004/0093492 A1 | 5/2004 | Daude et al. | 713/156 |
| 2004/0104927 A1 | 6/2004 | Husain et al. | |
| 2004/0107273 A1 | 6/2004 | Biran et al. | |
| 2004/0123153 A1 | 6/2004 | Wright et al. | 713/201 |
| 2004/0148306 A1 | 7/2004 | Moulton et al. | 707/101 |
| 2004/0180721 A1 | 9/2004 | Rowe | |
| 2004/0193876 A1 | 9/2004 | Donley et al. | |
| 2004/0201604 A1 | 10/2004 | Kraenzel et al. | 345/700 |
| 2004/0236843 A1 | 11/2004 | Wing et al. | 709/219 |
| 2004/0243928 A1 | 12/2004 | Hesmer et al. | |
| 2005/0027846 A1 | 2/2005 | Wolfe et al. | |
| 2005/0033808 A1 | 2/2005 | Cheng et al. | |
| 2005/0044197 A1 | 2/2005 | Lai | |
| 2005/0044544 A1 | 2/2005 | Slivka et al. | |
| 2005/0060281 A1 | 3/2005 | Bucher et al. | |
| 2005/0108297 A1 | 5/2005 | Rollin et al. | |
| 2005/0108546 A1 | 5/2005 | Lehew et al. | |
| 2005/0108593 A1 * | 5/2005 | Purushothaman et al. | 714/4 |
| 2005/0144218 A1 | 6/2005 | Heintz | 709/202 |
| 2005/0149729 A1 | 7/2005 | Zimmer et al. | 713/168 |
| 2005/0160289 A1 | 7/2005 | Shay | |
| 2005/0193245 A1 * | 9/2005 | Hayden et al. | 714/13 |
| 2005/0198196 A1 | 9/2005 | Bohn et al. | |
| 2005/0216524 A1 | 9/2005 | Gomes et al. | |
| 2005/0216902 A1 | 9/2005 | Schaefer | |
| 2005/0226059 A1 | 10/2005 | Kavuri et al. | |
| 2005/0256952 A1 | 11/2005 | Mouhanna et al. | |
| 2005/0262503 A1 | 11/2005 | Kane | |
| 2005/0268145 A1 | 12/2005 | Hufferd et al. | |
| 2005/0273486 A1 | 12/2005 | Keith, Jr. | 709/200 |
| 2005/0283606 A1 | 12/2005 | Williams | 713/166 |
| 2005/0286435 A1 | 12/2005 | Ogawa et al. | |
| 2006/0021040 A1 | 1/2006 | Boulanger et al. | 726/23 |
| 2006/0031377 A1 | 2/2006 | Ng et al. | |
| 2006/0031407 A1 | 2/2006 | Dispensa et al. | |
| 2006/0031529 A1 | 2/2006 | Keith, Jr. | 709/227 |
| 2006/0041641 A1 | 2/2006 | Breiter et al. | |
| 2006/0041759 A1 | 2/2006 | Kaliski, Jr. et al. | |
| 2006/0047716 A1 | 3/2006 | Keith, Jr. | 707/203 |
| 2006/0047946 A1 | 3/2006 | Keith, Jr. | 713/2 |
| 2006/0074943 A1 * | 4/2006 | Nakano et al. | 707/100 |
| 2006/0095705 A1 | 5/2006 | Wichelman et al. | 711/171 |
| 2006/0129459 A1 | 6/2006 | Mendelsohn | |
| 2006/0143709 A1 | 6/2006 | Brooks et al. | 726/23 |
| 2006/0149955 A1 | 7/2006 | Velhal et al. | |
| 2006/0179061 A1 | 8/2006 | D'Souza et al. | |
| 2006/0224544 A1 | 10/2006 | Keith, Jr. | 706/60 |
| 2006/0224545 A1 | 10/2006 | Keith, Jr. | 706/60 |
| 2006/0233310 A1 | 10/2006 | Adams, Jr. et al. | |
| 2007/0078982 A1 | 4/2007 | Aidun et al. | |
| 2007/0094269 A1 | 4/2007 | Mikesell et al. | |
| 2007/0143374 A1 | 6/2007 | D'Souza et al. | |
| 2007/0174658 A1 | 7/2007 | Takamoto et al. | |
| 2007/0174690 A1 * | 7/2007 | Kambara et al. | 714/13 |
| 2007/0185936 A1 | 8/2007 | Derk et al. | |
| 2007/0233633 A1 | 10/2007 | Keith, Jr. | 706/60 |
| 2007/0239905 A1 | 10/2007 | Banerjee et al. | 710/22 |
| 2007/0271290 A1 | 11/2007 | Keith, Jr. | 707/101 |
| 2007/0271428 A1 * | 11/2007 | Atluri | 711/162 |
| 2007/0274315 A1 | 11/2007 | Keith | 370/392 |

| | | |
|---|---|---|
| 2007/0276836 A1 | 11/2007 | Chatterjee et al. |
| 2008/0016387 A1 | 1/2008 | Bensinger |
| 2008/0034019 A1 | 2/2008 | Cisler et al. |
| 2008/0034071 A1 | 2/2008 | Wilkinson et al. |
| 2008/0077622 A1 | 3/2008 | Keith .......................... 707/200 |
| 2008/0077630 A1 | 3/2008 | Keith .......................... 707/204 |
| 2008/0127294 A1 | 5/2008 | Keith ................................ 726/1 |
| 2008/0209142 A1* | 8/2008 | Obernuefemann ........... 711/161 |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0094362 A1 | 4/2009 | Huff |
| 2010/0050011 A1 | 2/2010 | Takamoto et al. |

OTHER PUBLICATIONS http://www.swapdrive.com/sdbackup.asp.
http://www.macrovision.com/products/flexnet_installshield/installshield/overview/index.shtml, pp. 1-3.
http://macrovision.com/products/flexnet_installshield/installshield/index.shtml, pp. 1-2.
http:/ www.stealthbits.com/, pp. 1-2.
http://www.microsoft.com/technet/prodtetchnol/windows2000serv/maintain/featusability/inmnwp.mspx, pp. 1-36.
http://en.wikipedia.org/wik/Expert_system, pp. 1-9.
http://www.pctools.com/registry-mechanic, pp. 1-2.
IEEE100 The Authoritative Dictionary of IEEE Standards Terms, Seventh Edition, Jan. 2003, 3 pages.
Vmware, VMware Infrastructure Architecture Overview, Jun. 14, 2006, http:/www.vmware.com/resourse/techresources/, pp. 1-14.
Vmware, Using VMware Infrastructure for Backup and Restore, Oct. 26, 2006, http:/www.vmware.com/resourse/techresources/, pp. 1-20.
Bandwidth Capping at Source http://www.24onlinebilling.com/download/whitepapers/Bandwidth%20Capping%20At%20Source.pdf pp. 1-9.
IBM Corporation, AFS: "User Guide", First Edition, Version 3.6. Apr. 2000, pp. 112.
Shepler et al. "RFC 3530—Network File System (NFS) version 4 Protocol", Standards Track, Apr. 2003, pp. 278, http://tools.ietf.org/html/rfc3530#page-119.
Microsoft@ Computer Dictionary, Fifth Edition, 2002, 3 pages.
Tridgell, A., "Efficient Algorithms for Sorting and Synchronization," Thesis, The Australian National University, Feb. 1999, 106 pages.
MacDonald, J.P., "File System Support for Delta Compression," University of California at Berkeley, Dept. of Electrical Engineering and Computer Sciences, May 19, 2000, 32 pages.
Muthitacharoen et al., "A Low-bandwidth Network File System," MIT Laboratory for Computer Science and NYU Department of Computer Science, 2001, 14 pages.
Yu et al., "Scalable network resource management for large scale Virtual Private Networks," Simulation Modeling Practice and Theory, 12 (2004) pp. 263-285.
Cisco PIX "Configuring an IPSec Tunnel Between a Cisco Secure PIX Firewall and a Checkpoint NG Firewall," May 12, 2006, document ID 23785.
Random House Unabridged Dictionary, "device: meaning and definitions," 1997, Random House Inc., retrieved via "http://dictionary.infoplease.com/device.".
Microsoft Press, Microsoft® Computer Dictionary, Fifth Edition, May 1, 2002, p. 39.
Definition of Plug-in (computing) from http://en.wikipedia.org/wiki/Plug-in_(computing), printed Jun. 18, 2011, 1 page.
Plug-in definition from Wikipedia, http://en.wikipedia.org/wiki/Plug-in_(computing) printed Nov. 6, 2011, 5 pages.

* cited by examiner

VIRTUAL RECOVERY SERVER

FIELD OF THE INVENTION

The present invention relates to the field of computing. More specifically, the present invention relates to the field of implementing a virtual recovery server.

BACKGROUND OF THE INVENTION

A typical network requires the use of one or more servers to store, distribute and process data. Furthermore, the network implements a backup system to save data in the event a server loses data whether it be due to a virus, software issue or hardware failure. Although the data is backed up, that does not remedy the problem of the server being inaccessible as a result of a malfunction. Once a server fails, an administrator has to replace the server with another server which is a process that could take a few hours or days if a new server needs to be purchased. With a server down, data stored on that server is likely inaccessible which causes problems such as a website being unavailable. It has been estimated that millions of dollars are lost due to system inaccessibility. Furthermore, there is a significant effect on reputation when a company's website is down. Moreover, for Local Area Networks (LANs) within an organization, a server being down would halt productivity if employees are unable to access their data.

A solution of ensuring that the server information is continuously available is to utilize a dedicated backup server for each server. While that works well with one server, it becomes a high cost solution with multiple servers as each server typically costs many thousands of dollars.

SUMMARY OF THE INVENTION

A virtual recovery server is described herein. The virtual recovery server is a software implementation on a storage server which generates a virtual server to replace a physical server when the physical server becomes inaccessible. While the physical server is inaccessible, the virtual recovery server is able to mimic the actions and data contained on the physical server. Thus, when users attempt to access an application or data that is on the physical server, they will not experience an interruption and will continue to access the information as if the physical server were up and running. The virtual recovery server is able to run for up to a number of days. When a new or repaired physical server is available the virtual recovery server is deleted after the data acquired by the virtual server is transmitted to the new physical server.

In one aspect, a system for providing network stability and data reliability comprises a first server, a second server coupled to the first server wherein the second server stores data received from the first server and a virtual server activated by the second server when the first server fails, wherein the virtual server performs functions of the first server. The second server is a storage server. The first server backs up the data onto the second server using a continuous backup scheme. The second server stores a system image of the first server. The second server transfers the system image to the virtual server when generating the virtual server. The virtual server transfers the system image to a replacement server for the first server. The virtual server mimics the first server. The virtual server is activated in real-time. The second server continues to back up the data while running the virtual server. The first server is accessible by customers.

In another aspect, a system for providing network stability and data reliability comprises a set of first servers, a second server coupled to the set of first servers wherein the second server stores data received from the set of first servers and a virtual server activated for each failed server in the set of first servers, wherein the virtual server is activated by the second server and further wherein the virtual server performs functions of each failed server. The second server is a storage server. The set of first servers back up the data onto the second server using a continuous backup scheme. The second server stores a system image of each server of the set of first servers. The second server transfers the system image to the virtual server when generating the virtual server, further wherein the system image corresponds to the failed server of the set of first servers. The virtual server transfers the system image to a replacement server for the failed server of the set of first servers. The virtual server mimics the failed server of the set of first servers before the server failed. The virtual server is activated in real-time. The second server continues to back up the data while running the virtual server. The set of first servers are accessible by customers.

In yet another aspect, a method of providing network stability and data reliability comprises backing up data from a first server to a second server, activating a virtual server when the first servers fails and serving the data utilizing the virtual server until the first server is replaced. The method further comprises replacing the failed server. The method further comprises deleting the activated virtual server. The second server is a storage server. The first server backs up the data onto the second server using a continuous backup scheme. The method further comprises storing a system image of the first server on the second server. The method further comprises transferring the system image from the second server to the virtual server when generating the virtual server, wherein the system image corresponds to the failed first server. The method further comprises transferring the system image from the virtual server to a replacement server for the failed first server. Serving data utilizing the virtual server includes mimicking the failed first server before the server failed. Generating the virtual server is in real-time. The second server continues to back up the data while running the virtual server. The first server is accessible by customers. The first server is one of a set of first servers.

In yet another aspect, a network of devices for providing network stability and data reliability comprises a set of first servers, a second server coupled to the set of first servers, wherein the second server stores data received from the set of first servers and generates a virtual server for each failed server in the set of first servers and further wherein the virtual server performs functions of each failed server, a regional data center coupled to the second server for backing up the data regionally and a remote data center coupled to the regional data center for backing up the data remotely. The second server is a storage server. The set of first servers back up the data onto the second server using a continuous backup scheme. The second server stores a system image of each server of the set of first servers. The second server transfers the system image to the virtual server when generating the virtual server, further wherein the system image corresponds to the failed server of the set of first servers. The virtual server transfers the system image to a replacement server for the failed server of the set of first servers. The virtual server mimics the failed server of the set of first servers before the server failed. The virtual server is activated in real-time. The second server continues to back up the data while running the virtual server. The set of first servers are accessible by customers.

In another aspect, an apparatus for providing network stability and data reliability comprises a storage component, a data backup application stored on the storage component for backing up data received from a server and a virtual machine application stored on the storage component for generating a virtual server when the server fails. A server image is pre-installed on the storage component. The server image corresponds to the server. A plurality of server images are pre-installed on the storage component. A server image is acquired from the server.

DETAILED DESCRIPTION OF THE PREFERRED EMBODIMENT

A virtual recovery server is described herein. A server configuration includes one or more servers in addition to a storage server or a backup server. Using a continuous backup scheme, the one or more servers continuously back up their data on the storage server. The storage server stores all of the relevant application and user data corresponding to each server. The storage server also stores and is aware of the environment on each server. For instance, if one of the servers is a SQL server, the storage server contains the necessary software and/or image to replicate the SQL server. The virtual recovery server is generated using virtual machine technology and backup technology. The storage server generates the virtual server to replace a physical server when the physical server fails. The virtual server becomes a temporary replacement server in real-time (e.g. instantaneously aside from set up time) so that the change is seamless.

While running the virtual server, the storage server still performs backup processes. As described, the storage server is aware of each server's environment, and thus is able to represent a virtual server that is the same as the faulty server. While the physical server is inaccessible, the virtual recovery server is able to mimic the actions and data contained on the physical server. Thus, when users attempt to access an application or data that is on the physical server, they will not experience an interruption and will continue to access the information as if the physical server were up and running. The virtual recovery server is able to run for up to many days. Then, when a new physical server or repaired server is available, the virtual server is no longer needed. To incorporate the new server into the system quickly and easily, the server image of the virtual server is sent to the new server.

In the event that more than one server fails at roughly the same time, the storage server is able to generate a virtual recovery server corresponding to each server. Therefore, multiple virtual recovery servers are able to be generated if needed.

Figure 1A:
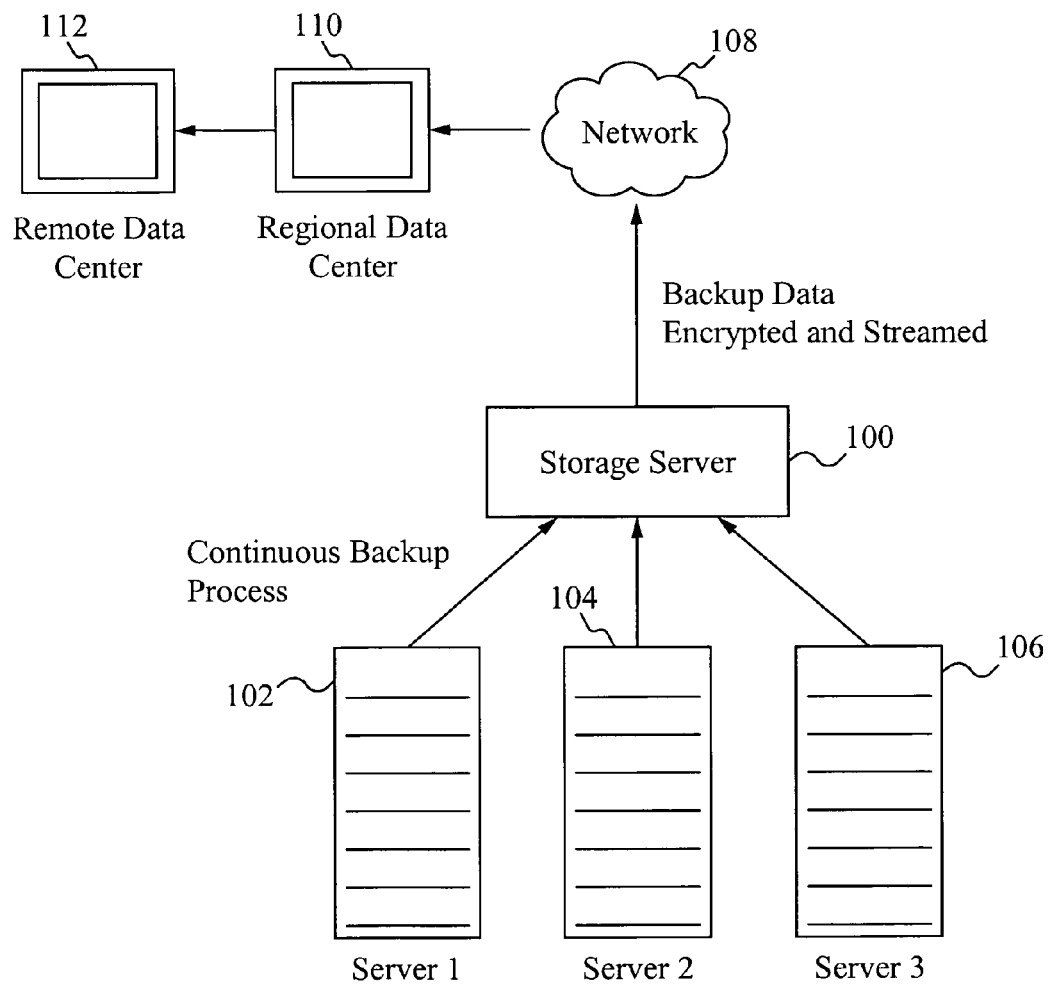
FIG. 1A illustrates a graphical representation of a server configuration.

FIG. 1A illustrates a graphical representation of a server configuration. A storage server 100 backs up data from servers 102, 104, 106. The servers 102, 104, 106 continuously back up data to the storage server 100. In some embodiments, the backup is performed by taking snapshots or images of each of the servers 102, 104, 106 on a periodic basis, such as, every hour and transmitting the snapshots to the storage server 100. In other embodiments, the snapshots are taken more or less often depending on how critical the data is. Furthermore, the data is able to be backed up by means other than snapshots. The storage server 100 is any storage implementation such as a server with dedicated storage or a set of Redundant Array of Inexpensive Disks (RAIDs). In embodiments where it is crucial to ensure that the backed up data is even more secure, the data is sent via a network 108 to a regional data center 110 and a remote data center 112. The regional data center 110 backs up the data in a location relatively near the servers 102, 104, 106, while the remote data center 112 is remotely stored to back up the data in case of an earthquake or other disaster that destroys data in one area but not in a remote area.

Figure 1B:
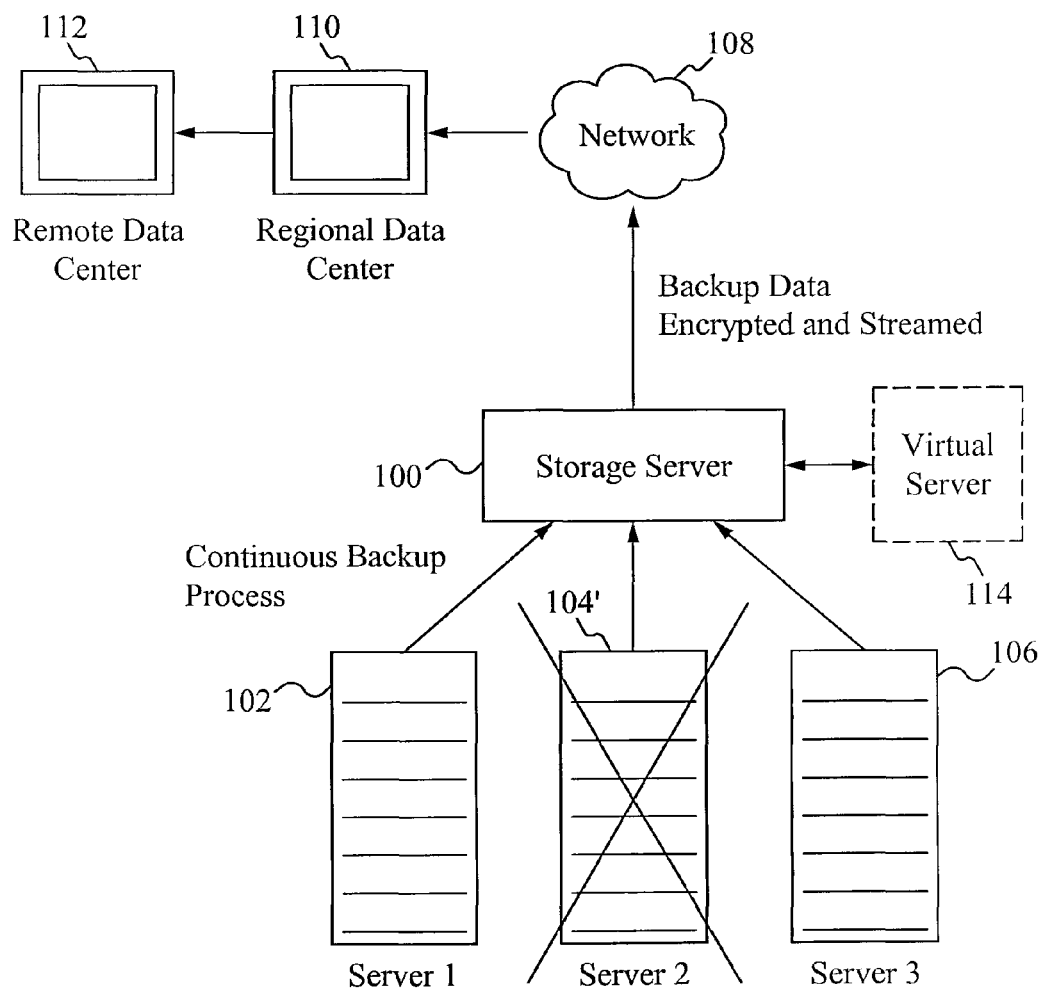
FIG. 1B illustrates a graphical representation of an embodiment of the present invention.

FIG. 1B illustrates a graphical representation of an embodiment of the present invention. As described in FIG. 1A, the storage server 100 is available for backing up data from the servers 102, 104, 106. Within the storage server 100 is also the capability to generate a virtual server 114. As shown in FIG. 1B, the server 104' has failed and is inaccessible. Therefore, the storage server 100 generates the virtual server 114 to temporarily take the place of the faulty server 104'. The virtual server 114 mimics the faulty server 104' by taking the configuration and data from the storage server 100 and generating a server using that information. By generating the virtual server 114 which appears to be the same entity as the faulty server 104', users who attempt to access data or applications on the faulty server 104' will not experience any issues. The virtual server 114 acts the same as the faulty server 104' before it failed. In embodiments where it is crucial to ensure that the backed up data is secured not only once, but multiple times, the data is sent via a network 108 to a regional data center 110 and a remote data center 112.

A variety of people, such as customers and employees, are able to utilize the servers 102, 104, 106 but possibly for different purposes. For example, in a small office setting for a software/web development company, each employees' computer is coupled to a central server so that projects are able to be shared easily between developers. Furthermore, another server is also available, however this server is utilized by customers over the Internet who visit the company's interactive website. On the interactive website, customers are able to download the company's software products, search for information about the company and store personal data including photographs and web logs. Both servers are backed up by a storage server which contains separate images of each server. The images are updated as often as desired to ensure that data is not lost. The storage server also contains virtual machine applications to enable generation of virtual servers. If the project server fails, a virtual server is generated by the storage server using the image of the failed project server before it failed. Therefore, the virtual server is virtually identical to the failed server in appearance to the developers when they continue accessing the server. If the customer server fails, a virtual server is also generated by the storage server; however this time the image used is from the failed customer server before it failed. Thus customers will not notice any change when they access the company's website. When a new hardware server or repaired server is coupled to the network, one of the virtual servers, preferably the one corresponding to the server that failed first, transfers the image to the new hardware server and the virtual server is deleted. The other virtual server continues to run until its replacement server is installed. The above example is not meant to limit the invention in any way. Particularly, although only two servers were described, any number of servers are able to be implemented by the present invention.

Figure 2:
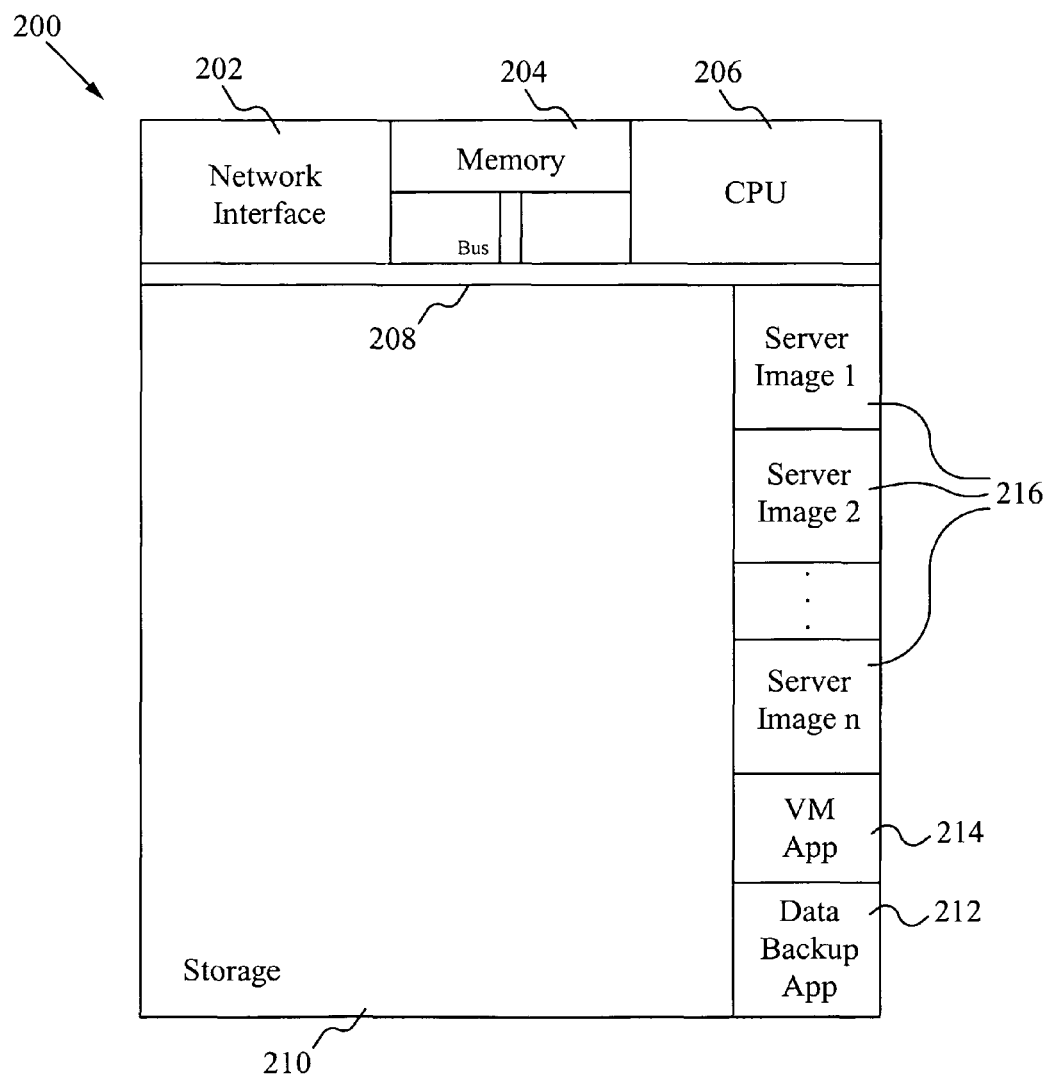
FIG. 2 illustrates a block diagram of a storage server of the present invention.

FIG. 2 illustrates a block diagram of a storage server of the present invention. A storage server 200 contains standard server components including a network interface 202, a memory 204, a central processing unit 206, a system bus 208 and storage 210 in addition to other standard computing components. Furthermore, the storage server 200 is able to have multiple of each of these components, for example many servers have more than one central processing unit 206. The storage 210 is able to be any storage implementation such as a hard disk drive, RAID, or another form of storage. Contained within the storage are applications for data backup 212 and virtual machine generation 214. The data backup application(s) 212 manage the back up of the data that is contained on the servers 102, 104, 106 (FIG. 1A). The virtual machine generation application(s) 214 generates a virtual server when one or more of the servers 102, 104, 106 (FIG. 1A) fails. In some embodiments, the storage server 200 also contains images 216 of the servers 102, 104, 106 (FIG. 1A). In other embodiments, the images are acquired after the server is coupled to the network.

Figure 3:
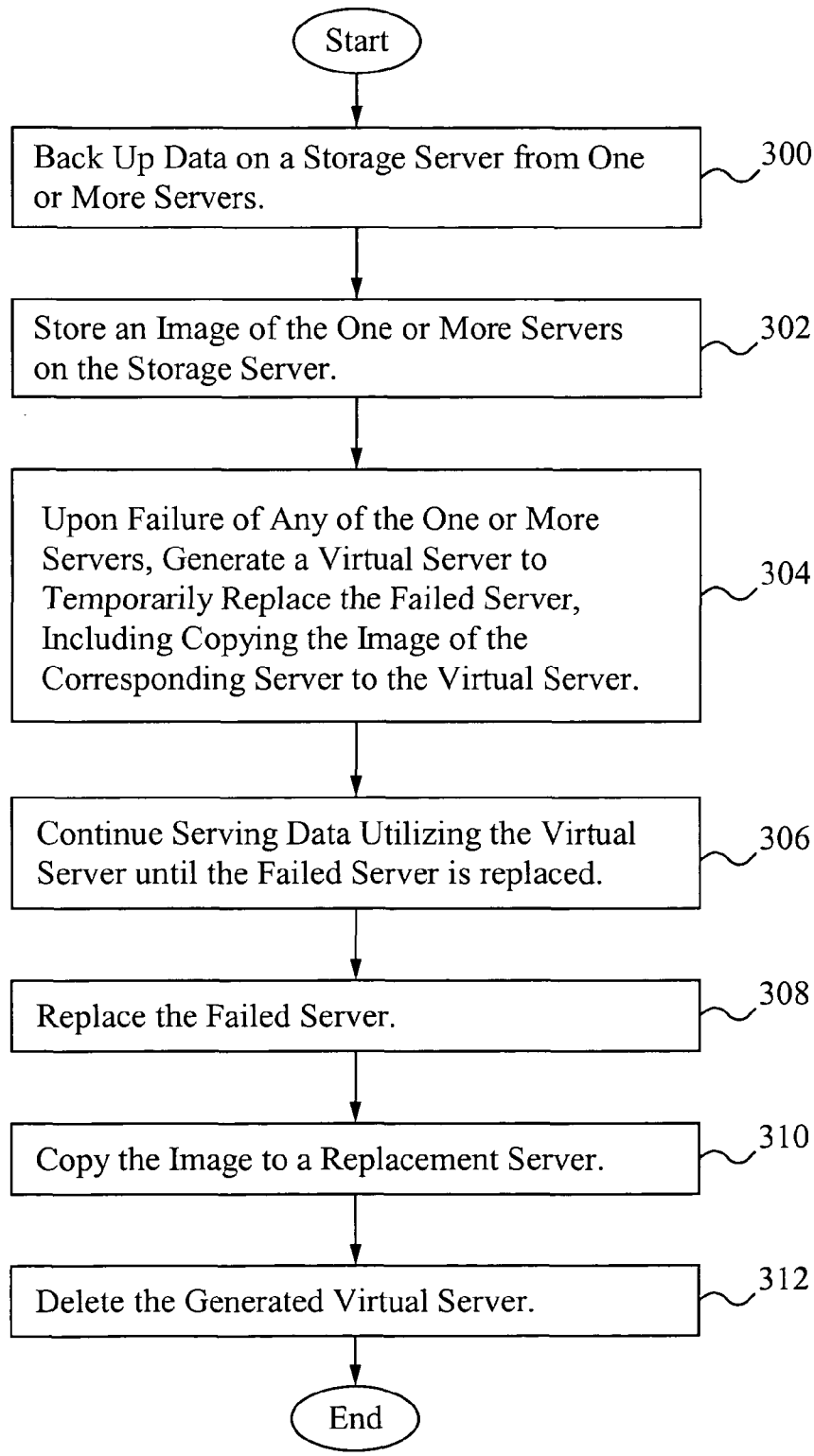
FIG. 3 illustrates a flow chart of utilizing a virtual server of the present invention.

FIG. 3 illustrates a flow chart of utilizing a virtual server of the present invention. In the step 300, data is backed up on a storage server from the one or more servers. In the step 302, an image of each of the one or more servers is stored on the storage server. Upon failure of any of the one or more servers, a virtual server is generated to temporarily replace the failed server, in the step 304. The virtual server is generated using the backed up image of the failed server. In the step 306, the generated virtual server continues serving data until the failed server is replaced. In the step 308, the failed server is replaced and in the step 310, the image on the virtual server is copied to the replacement server for another smooth transition. The generated virtual server is then deleted, in the step 312. In some embodiments, the process automatically occurs; whereas, in other embodiments an administrator initiates and maintains the process.

The present invention is utilized by installing the appropriate applications on a storage or backup server which then generates a virtual server when a server within a network fails. Failures include hardware and software issues that make the server inaccessible. The applications then take care of backing up necessary system, application and user data. In addition, the applications generate the virtual server when a server fails and supply the virtual server with the proper data. After the virtual server is generated, it is available for use while the server it replaced. However, once a replacement or repaired server is coupled to the network, the virtual server transfers the data to the replacement server and is no longer needed. Therefore, by utilizing the present invention, one or more servers within a network are able to fail, yet virtual servers will take their place while replacement servers are being retrieved. Thus, there is minimal downtime for each server.

In operation, the present invention provides a temporary backup virtual server when a physical server fails. One or more servers operate by serving information to users, where serving includes hosting a website, providing/storing data, executing applications or anything a server is capable of doing. Furthermore, each of these servers typically has a dedicated task or at least partitioned tasks, so that one server may be deemed a SQL server while another is focused on a different aspect of serving. A storage or backup server is utilized to back up these servers. The storage server utilizes any backup technology but preferably receives images of each server. When one or more of the servers fails, the storage server generates a separate virtual server for each failed server using virtual machine technology. Additionally, the image of that specific server is used to generate the virtual server, so that the virtual server replicates the failed server. Therefore, the failed server is only down for a short amount of time while the virtual server is being generated. Once the virtual server is running, users should experience no difference than if the physical server were still running. Once a replacement server arrives or the failed server is repaired, this replacement or repaired server is coupled to the network. Since there is no rush to install the new server, preferably the replacement is installed at a time when activity on the server is low and users are informed of a short period of downtime. The virtual server transfers the image to the replacement, so that again, users experience no change in functionality and the replacement server joins the network without causing problems.

In addition to utilizing the virtual recover server when a server has failed, the virtual recovery server is able to detect when a server is about to fail, so that the virtual recovery server is able to be generated before the server fails. With such a detection, it is possible to have zero downtime. A failing server is able to be detected in a number of ways such as by monitoring the system environment. For example, if the server's internal temperature is reaching a dangerously high temperature, that is an indicator that the server is about to shut down, and thus the virtual recovery server should take over. Other methods of detecting a failing server are possible.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for providing network stability and data reliability, comprising:
   a. a first server;
   b. a second server coupled to the first server wherein the second server comprises a memory device and stores first server data received from the first server on the memory device; and
   c. a virtual server activated by the second server when the first server fails, wherein the virtual server performs functions of the first server and further wherein the second server continues to back up data after the first server fails while running the virtual server.

2. The system as claimed in claim 1 wherein the second server is a storage server.

3. The system as claimed in claim 1 wherein the first server backs up the first server data onto the second server using a continuous backup scheme.

4. The system as claimed in claim 1 wherein the second server stores a system image of the first server.

5. The system as claimed in claim 4 wherein the second server transfers the system image to the virtual server when generating the virtual server.

6. The system as claimed in claim 5 wherein the virtual server transfers the system image to a replacement server for the first server.

7. The system as claimed in claim 1 wherein the virtual server mimics the first server.

8. The system as claimed in claim 1 wherein the virtual server is activated in real-time.

9. The system as claimed in claim 1 wherein the first server is accessible by customers.

10. A system for providing network stability and data reliability, comprising:
   a. a set of first servers;
   b. a second server coupled to the set of first servers wherein the second server comprises a memory device and stores first servers data received from the set of first servers on the memory device; and
   c. a virtual server activated for each failed server in the set of first servers, wherein the virtual server is activated by the second server and further wherein the virtual server performs application functions of each failed server, and further wherein the second server continues to back up data received from the first servers that did not fail after the failure of each failed server while running the virtual server.

11. The system as claimed in claim 10 wherein the second server is a storage server.

12. The system as claimed in claim 10 wherein the set of first servers back up the first servers data onto the second server using a continuous backup scheme.

13. The system as claimed in claim 10 wherein the second server stores a system image of each server of the set of first servers.

14. The system as claimed in claim 13 wherein the second server transfers the system image to the virtual server when generating the virtual server, further wherein the system image corresponds to the failed server of the set of first servers.

15. The system as claimed in claim 14 wherein the virtual server transfers the system image to a replacement server for the failed server of the set of first servers.

16. The system as claimed in claim 10 wherein the virtual server mimics the failed server of the set of first servers before the server failed.

17. The system as claimed in claim 10 wherein the virtual server is activated in real-time.

18. The system as claimed in claim 10 wherein the set of first servers are accessible by customers.

19. A method of providing network stability and data reliability, comprising:
   a. backing up first server data from a first server to a second server;
   b. activating a virtual server when the first server fails, wherein data is continuously backed up after the first server fails while the virtual server is running; and
   c. serving the first server data utilizing the virtual server until the first server is replaced.

20. The method as claimed in claim 19 further comprising replacing the failed server.

21. The method as claimed in claim 19 further comprising deleting the activated virtual server.

22. The method as claimed in claim 19 wherein the second server is a storage server.

23. The method as claimed in claim 19 wherein the first server backs up the first server data onto the second server using a continuous backup scheme.

24. The method as claimed in claim 19 further comprising storing a system image of the first server on the second server.

25. The method as claimed in claim 24 further comprising transferring the system image from the second server to the virtual server when generating the virtual server, wherein the system image corresponds to the failed first server.

26. The method as claimed in claim 25 further comprising transferring the system image from the virtual server to a replacement server for the failed first server.

27. The method as claimed in claim 19 wherein serving data utilizing the virtual server includes mimicking the failed first server before the server failed.

28. The method as claimed in claim 19 wherein generating the virtual server is in real-time.

29. The method as claimed in claim 19 wherein the first server is accessible by customers.

30. The method as claimed in claim 19 wherein the first server is one of a set of first servers.

31. A network of devices for providing network stability and data reliability, comprising:
   a. a set of first servers;
   b. a second server coupled to the set of first servers, wherein the second server comprises a first memory device and stores first servers data received from the set of first servers on the first memory device and generates a virtual server for each failed server in the set of first servers and further wherein the virtual server performs application functions of each failed server, wherein the second server continues to back up data received from the first servers that did not fail after the failure of each failed server while running the virtual server;
   c. a regional data center coupled to the second server, wherein the regional data center comprises a second memory device for backing up the first servers data regionally on the second memory device; and
   d. a remote data center coupled to the regional data center, wherein the remote data center comprises a third memory device for backing up the first servers data remotely on the third memory device.

32. The network of devices as claimed in claim 31 wherein the second server is a storage server.

33. The network of devices as claimed in claim 31 wherein the set of first servers back up the first servers data onto the second server using a continuous backup scheme.

34. The network of devices as claimed in claim 31 wherein the second server stores a system image of each server of the set of first servers.

35. The network of devices as claimed in claim 34 wherein the second server transfers the system image to the virtual server when generating the virtual server, further wherein the system image corresponds to the failed server of the set of first servers.

36. The network of devices as claimed in claim 35 wherein the virtual server transfers the system image to a replacement server for the failed server of the set of first servers.

37. The network of devices as claimed in claim 31 wherein the virtual server mimics the failed server of the set of first servers before the server failed.

38. The network of devices as claimed in claim 31 wherein the virtual server is activated in real-time.

39. The network of devices as claimed in claim 31 wherein the set of first servers are accessible by customers.

40. An apparatus for providing network stability and data reliability, comprising:
   a. a storage component;
   b. a data backup application stored on the storage component for backing up server data received from a server; and
   c. a virtual machine application stored on the storage component for generating a virtual server when the server fails, wherein the data backup application continues to back up data after the server fails while the virtual server runs.

41. The apparatus as claimed in claim 40 wherein a server image is pre-installed on the storage component.

42. The apparatus as claimed in claim 41 wherein the server image corresponds to the server.

43. The apparatus as claimed in claim 40 wherein a plurality of server images are pre-installed on the storage component.

44. The apparatus as claimed in claim 40 wherein a server image is acquired from the server.

45. A system for providing network stability and data reliability, comprising:
   a. a first server;
   b. a second server coupled to the first server wherein the second server comprises a memory device and stores first server data received from the first server on the memory device; and
   c. a virtual server, wherein the virtual server performs functions of the first server and further wherein the second server continues to back up data while running the virtual server;
wherein the second server is configured to activate the virtual server near failure of the first server.

46. The system as claimed in claim 40 wherein the virtual server is generated in response to the failure of the first server.

47. The system as claimed in claim 1 wherein the virtual server is inactive before the failure of the first server.

* * * * *

UNITED STATES PATENT AND TRADEMARK OFFICE
CERTIFICATE OF CORRECTION

PATENT NO. : 8,423,821 B1  
APPLICATION NO. : 11/644451  
DATED : April 16, 2013  
INVENTOR(S) : Robert O. Keith, Jr.

Page 1 of 1

It is certified that error appears in the above-identified patent and that said Letters Patent is hereby corrected as shown below:

Title Page 2, U.S. Patent Documents,

IN THE "REFERENCES CITED" SECTION
    Please replace the cited U.S. Document "6,536,037 B1   3/2003 Barrese et al. ... 717/151" with -- 6,536,037   B1   3/2003 Guheen et al. ... 717/151 --.

Signed and Sealed this
Second Day of July, 2013

Teresa Stanek Rea
*Acting Director of the United States Patent and Trademark Office*